UNITED STATES PATENT OFFICE.

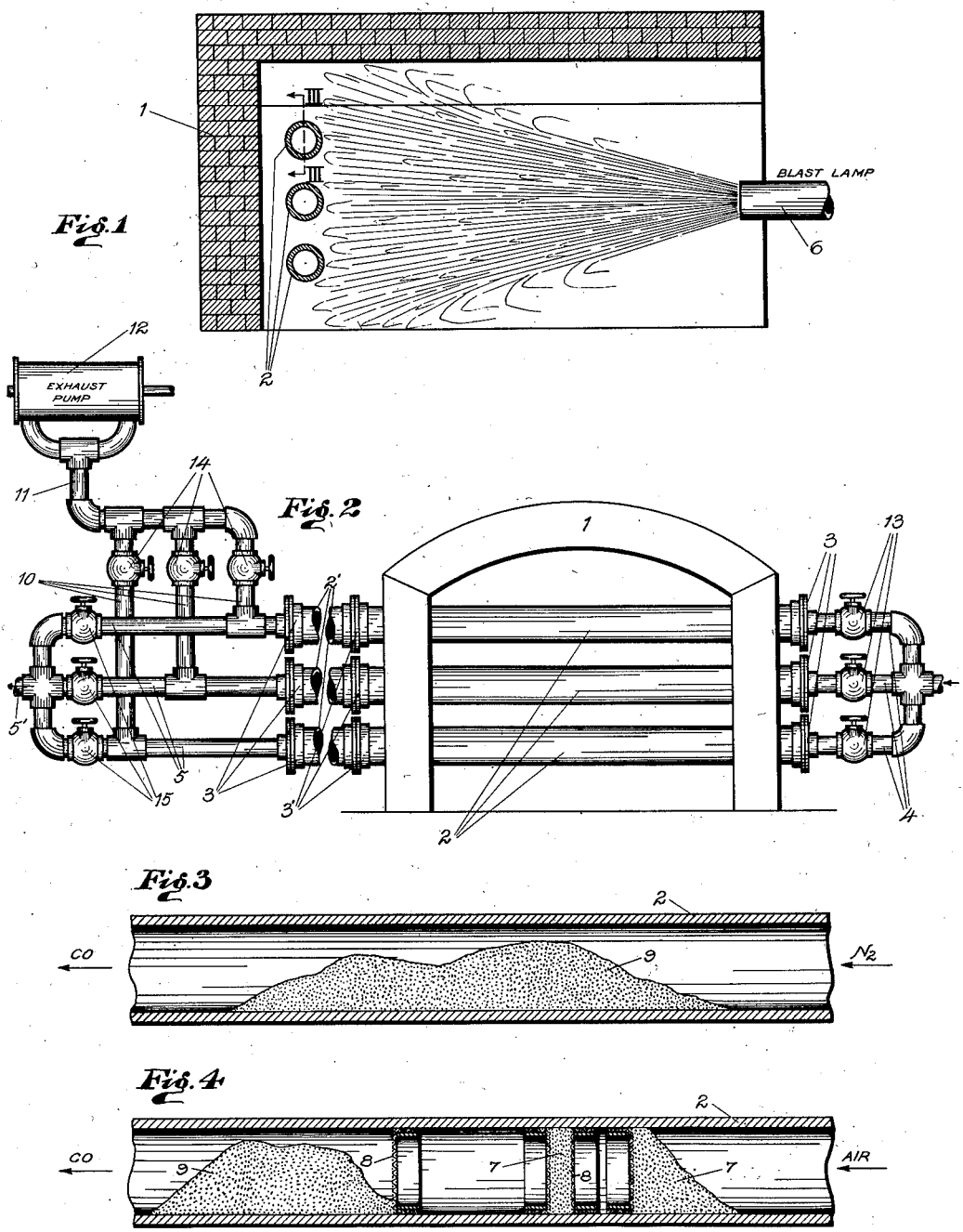

JOHN E. BUCHER, OF COVENTRY, RHODE ISLAND, ASSIGNOR TO NITROGEN PRODUCTS COMPANY, A CORPORATION OF RHODE ISLAND.

PROCESS OF PREPARING CYANOGEN COMPOUNDS.

1,094,976.  Specification of Letters Patent.  Patented Apr. 28, 1914.

Application filed December 18, 1912. Serial No. 737,368.

*To all whom it may concern:*

Be it known that I, JOHN E. BUCHER, of Coventry, in the county of Kent and State of Rhode Island, have invented certain new and useful Improvements in the Process of Preparing Cyanogen Compounds, of which the following is a specification.

This invention relates to the fixation of nitrogen and more particularly to an improved process of preparing, if desired, substantially pure cyanogen compounds and derivatives therefrom, together with valuable by-products incident to the production of such a compound or compounds.

The present process is, in certain of its aspects, to be regarded as an improvement upon the processes described in my pending applications for U. S. Letters Patent, respectively designated Serial No. 711,211, filed July 24, 1912, and Serial No. 726,924, filed October 21, 1912.

One of the features of importance involved in the present process is the utilization of distillation broadly and particularly of distillation under diminished pressure as a means for facilitating the production or preparation of pure or substantially pure cyanogen compounds, e. g. sodium cyanid. Such procedure is of very great importance when used in connection with the synthetic formation of cyanids and the like as set forth at length in my said pending applications, and especially in that designated Serial No. 726,924. In said application I have intimated that distillation of cyanid from the reactive mass containing catalytic material is feasible and I herein describe more particularly an advantageous way of effecting such distillation. While this operation is of particular value in connection with my said previously described processes, I do not wish to be limited thereto, except where in certain of the appended claims I specifically include as steps in the process certain of those more particularly set forth in said pending applications; since I am aware that the distillation of cyanids in the manner hereinafter described not only facilitates the production of such substances in a form in which they are substantially immediately ready for use without further treatment, but further is of value in effecting a purification of cyanids produced by other methods than those described in my said applications; so that it may even be applied to some of the very impure commercial cyanids produced by known processes, e. g. from nitrogenous materials such as bituminous coal or the like. The present process, therefore, not only effects the purification of cyanogen compounds in a physical sense, but, it may, in addition, also effect purification accompanied by chemical reactions.

I have found in my study of the art that with but few important exceptions, cyanids have been obtained by lixiviating the crude furnace-products, in which they are formed, with water; by absorbing cyanogen or hydrocyanic acid in aqueous alkaline solutions; by extracting them with alcohol; etc., followed by subsequent crystallization from the resulting solutions. This is especially true of the rather loosely so called synthetic processes; as the few known commercially sucessful processes in which the cyanids are drained off in the molten condition seem to be those using ammonia rather than free nitrogen for the production of the cyanids.

The above methods of purification depending upon lixiviation and crystallization are open to many serious objections, such as the poisonous properties of cyanogen compounds, the decomposition of the cyanids in water solution, expense, the sparing solubility of cyanids in alcohol, inflammability of the alcohol, etc. In some cases the lixiviation results in a loss of alkali; and, in substantially any case the reaction products must be allowed to cool before they can be lixiviated. Also the moist residue from lixiviation must in certain cases be freed from water before it can again be used for the preparation of another quantity of cyanid, because water will react deleteriously when materials such as potassium, sodium, or lithium, which may be directly concerned in the reaction in question, are used. It may also injure, or indeed in some cases render wholly useless many of the catalytic materials available for use, e. g. magnesium, lithium, calcium, certain nitrids, etc.

The foregoing and other objects of my invention will be hereinafter referred to and the novel process and steps in said process whereby the same may be attained will be more particularly set forth in the appended claims.

I am aware that various modifications and changes may be made in my process and the manner of conducting the same, without departing from the spirit of my invention and hence desire to be limited only by the scope of said claims considered broadly in the light of my disclosure.

In the accompanying drawing which forms a part hereof and in which like reference characters designate like parts throughout the several views, I have exemplified an apparatus suitable for the effectuation of my process, but it will be understood that I am not to be limited in any way to this exemplification since various other forms and types of apparatus are well adapted to the process in question.

Referring to the drawing: Figure 1 is a longitudinal vertical section of a muffle furnace with retorts in position therein. Fig. 2 is an end elevation of said furnace, the blast lamp being omitted for convenience of illustration. Fig. 3 is a fragmentary section taken on line III—III of Fig. 1. Fig. 4 is a similar section of a retort adapted for the use of air in the process.

Brickwork or other suitable material may be employed in the construction of the muffle 1, and one or more pipes 2, serving as retorts, may extend directly therethrough. Couplings or unions 3, serve to connect the ends of the retorts, or the extensions 2' of the same, hereinafter referred to, to the pipes 4—5; those designated 4 being the pipes for supplying nitrogen or air, as the case may be. The gases, notably carbon monoxid, evolved during the operation of the process are conveyed away via pipes 5—5'. A blast lamp 6, or other suitable source of heat may be disposed in the preferably open end of the muffle, and this apparatus should, of course, be capable of heating the retorts up to the reaction temperatures employed.

Assuming that the process is to be conducted in such fashion as to permit the use of air, the latter is led in through pipes 4 and preferably first encounters one or more masses 7 of charcoal or other suitable oxygen consuming material. These masses preferably substantially fill the pipes at the points where they are disposed so that all of the air is obliged to pass therethrough. I prefer to interpose wire gauze spacing or supporting screens 8, or the like, between the charcoal and the body of the reaction mixture 9 which is next encountered by the gases flowing through the pipe or retort; since it is desirable to keep the charcoal away from the charge.

During the course of the operation, the alkali metal will be evolved in the manner hereinafter described, and if the charcoal is in contact with the reactive mass or mixture, it may, by capillary action, or from any other cause, remove a portion of such alkali metal from said mass and thereby reduce the yield.

The mixture 9 preferably consists of pulverulent coke, graphite, charcoal, coal, or the like, very intimately mixed with finely divided catalytic material, e. g. iron, and sodium carbonate or other inexpensive source of the metal forming the base of the cyanogen compound sought, or to be incidentally formed during the operation.

If nitrogen be used instead of air, the charcoal screens or masses 7 may, of course, be omitted. The extensions or pipes 2' may be coupled direct to the exit ends of the respective retorts by couplings or unions 3', and to the pipes 5 by couplings 3, in such manner as to be individually readily removable therefrom without disturbing the remaining parts of the apparatus. Each of the pipes 5 is connected by a pipe 10 with a pipe 11 leading to an exhaust pump 12, or other suitable device by means of which a vacuum or partial vacuum can be created in the retorts; the several sets of valves 13, 14 and 15 providing means for preventing an influx of air or other gas into the particular retort or retorts in which it is desired to effect a reduction of pressure below that of the atmosphere. Thus, after the formation of a sufficient yield of cyanid in the reactive masses 9 has been effected, valves 13 and 15 will be closed and those designated 14 will be opened; the exhaust pump, of course, being in operation. The cyanid will distil out of the masses 9, at the temperature of the operation, and will condense in the extended and relatively cool tubes 2', depositing as a clear liquid which solidifies into glass-like masses or lumps. It may even be cast in molds to form sticks of substantially pure cyanid. When sufficient cyanid has been obtained in this manner, the blast lamp may be shut off, the valves 14 closed and the tubes or sections 2' removed, separately if desired, by loosening the couplings at the respective ends thereof.

The retorts and condensing tubes may be made of any suitable material but it is important in this connection to consider the rôle which certain substances, such as iron are adapted to play under conditions to which I shall refer, in decomposing cyanogen compounds, e. g. sodium cyanid; iron, for example by reason of its ability, at a relatively high temperature, to absorb or separate carbon from such compounds. Failure to note this phenomenon possibly explains the failure of certain known processes having for their object the synthetic production, or the purification, of cyanids.

The action of a material capable of dissociating the cyanogen radical is exemplified in the following equation:—

(1) $2KCN + \text{iron} = 2K + \text{carburized iron} + N_2$.

In said application, Serial Number 726,924, I have shown that quantitative yields of alkali cyanids can be obtained by heating alkali carbonates with iron and carbon in a current of nitrogen under conditions which I shall herein briefly review, and since, in view of the foregoing equation, it is possible to heat cyanid with carbon-free iron so as to effect a quantitative decomposition of the cyanid, it follows, conversely, that when the iron is sufficiently carburized, no decomposition should take place. Pursuant to this, I have found that sodium cyanid as well as potassium cyanid can be distilled readily, even at atmospheric pressure, and without sensible decomposition, in receptacles composed of sufficiently carburized iron, which material is principally of value on account of its cheapness as well as its durability, and of its ability to withstand the temperatures at which the operation can be conveniently conducted. It is possible to effect the cyanid distillation in vessels of hard glass, quartz, or the like; while iron apparatus lined with a substance not capable of decomposing alkali cyanids, e. g. copper, may also, of course, be used for the distillation of the alkali cyanids under diminished pressure. If iron apparatus be used, the iron parts subject to contact with the hot cyanid vapors or liquid will in time become sufficiently carburized by the action of the cyanid itself, after which the distillation may be advantageously conducted in such apparatus. Considering next the reactive materials used in the process, the manner of disposing them in the retort or retorts, and the reactions which take place therebetween, I may cite, preliminarily, the following equation, taken from my said application, Serial Number 726,924.

(2) $2Na + 2C + N_2 + iron = 2NaCN + iron$.

This equation is, it will be observed, practically the reverse of equation 1; the direction of the reaction depending upon the active masses of materials involved and conditions of temperature, etc. That it is possible to effect the formation of alkali cyanids synthetically from compounds of the metal, e. g. sodium, forming the base of the cyanogen compound to be produced, is also shown by my disclosure in said application wherein certain experiments are set forth at length, the results of which demonstrate that from about 700° C. (roughly) substantially up to the eutectic point of the carbon dissolving catalytic material, alkali cyanids may be produced from, for example, alkali carbonates, hydrates, or the like, free nitrogen and carbon, through the instrumentality or intermediacy of said catalytic material while the latter is in solid form.

The preferred catalytic material is iron which is a most efficient solvent for carbon; and the preferred form of this catalytic material is the one exposing the greatest practicable catalytic solution surface compared to the volume of said material, i. e. finely pulverulent. I also set forth at length in my last mentioned application the desirability of not only providing such an enormously extended solution surface, but further the advantages of maintaining said surface, both as regards the maintenance of an adequate supply of carbon in solution therein and further as to the physical maintenance of said surface by conducting the operation, where a solid catalyzer was employed, at temperatures materially below the eutectic point of said material when containing preferably substantially its maximum carbon content. Therein were also shown the advantages of disposing the mass of reactive material comprising the alkali metal carbonate (for example), carbon (or carbonaceous material), and the finely powdered catalyzer, intimately mixed in such fashion as to not only maintain the carbon supply in the solution surfaces or "surface," but to further provide the requisite porosity in a sufficient extent of said mass to enable the free nitrogen to adequately penetrate thereinto; and to also provide by capillary action a relatively enormously extended reactive film surface, the latter consisting of the alkali metal supplying material, videlicit, liquid sodium carbonate, drawn up (or retained) by the wick like action of the porous portions of the reactive mass, from the bulk of said carbonate held by gravity in the lower portions of said mass. I referred in said case, also, to the desirability of maintaining an adequate supply of nitrogen whereby to facilitate the liberation of alkali metal vapor from the compound constituting the source of the same, by reducing the vapor pressure of said metal; the nitrogen current not only serving to mechanically remove said vapor but also chemically removing the same by combining therewith and with carbon at the solution surface, when said surface was disposed at the place of liberation of said metal.

As I have herein previously indicated, the possibility of cyanid distillation from the residues of the cyanid forming reaction were considered in said application, and attempted in my comparatively early work upon this subject. At atmospheric pressure, however, the boiling point of the more commonly used cyanids, e. g. sodium and potassium cyanids, is for practical purposes relatively too near the eutectic point of iron and carbon; so that I found it inexpedient to remove either of them by distillation from said residues, particularly when the latter comprised a mixture containing a large excess of graphite (or the like) and iron, on account of the melting of the carburized iron. As I have previously intimated, however, with care, the distillation can be made effective even at atmospheric pressure, when conducted in properly carburized iron receptacles.

Even the lowering of the partial vapor pressure by the passage of a considerable current of nitrogen, which procedure was at first resorted to upon encountering this difficulty, I found fails to remove the cyanid from the mixture in practical quantities, at temperatures somewhat below the melting point of copper. I solved the problem, however, finally as I have already indicated, by subjecting the cyanid containing residues of the reactive mass to distillation at a reduced or diminished pressure, the distillation being preferably effected directly in the retort and after the formation of a proper yield of cyanid therein; the diminished pressure in this receptacle being produced by means of an efficient vacuum or exhaust pump and the retort meanwhile being adequately heated. The result was extremely satisfactory; the cyanid distilling out of the iron-graphite mass (iron being the catalytic material, and graphite the source of carbon, in this instance) quantitatively at temperatures very considerably below the melting point of copper.

The following experiment may be given by way of example. A thin copper tube, closed at one end and containing a mixture of sodium cyanid, produced from the action of nitrogen on sodium carbonate, graphite and iron, was forced into an iron tube. This iron tube was closed at one end and the other end connected with an efficient vacuum or exhaust pump. The outer iron tube served to protect the copper from oxidation and also from any tendency to collapse under the effective external pressure developed. The tube was then heated in a furnace to 1020° C. for a short time under diminished pressure in the interior thereof. Upon cooling and opening said tube, it was found that cyanid had distilled from the mass, collected as a pool of liquid in the colder part of the tube, and finally solidified (in this instance) to a mass which was so clear and transparent that fragments of it could not be told, off hand, from fragments of clear glass until water was added. Titration with a solution of silver nitrate indicated that the specimen contained 99.9 per cent. of sodium cyanid and the solution gave no precipitate with calcium hydroxid. This showed the cyanid to be free from alkali carbonates and to be substantially chemically pure. This experiment at a temperature below the melting point of copper proves that we can very easily produce pure cyanid from a mixture of an alkali compound or compounds, iron and graphite, in a suitable receptacle, by passing a current of nitrogen gas over the heated mass; while, thereafter, by simply shutting off the nitrogen and opening the connection to the vacuum pump, the cyanid can be distilled quickly from the hot mass and collected as pure liquid or solid cyanid in a receptacle suitably connected with the apparatus.

There is no necessity for opening the apparatus with consequent danger of oxidation and cooling of the charge; or for lixiviation; and further there is no danger of attacking the copper linings of the apparatus, if this be the lining material used. The residue of iron and graphite which remained in the tube was lixiviated with water and found to be so free from alkali compounds that the resulting aqueous solution did not give any precipitate with silver nitrate or calcium hydroxid nor did it give any Prussian blue test. It must hence, have been substantially free from cyanids and carbonates. Moreover, the iron-graphite residue left from such a distillation is not caked and is in excellent condition, as regards the catalytic solution surface, to be mixed with another charge of alkali carbonate or carbonates and used for the production of another portion of the alkali cyanid or cyanids sought. Indeed, it is even possible to admit the new charge of alkali (metal, carbonate, hydrate or other source of the alkali metal) in a molten or vaporous condition to the iron-carbon mixture in the tube. The process is thus under excellent control, and provided that a suitable charging and mixing device be provided even the graphite or carbon charge can be renewed, without having to cool the tube or even to remove its contents. The alkali carbonates may also be distilled under diminished pressure into the catalytic mixture; thus developing still further the mode of operating the process set forth in my said last mentioned application wherein it was shown to be practicable to convey the alkali metal to a relatively remote carbon containing catalytic surface, either as a vapor of said metal or as a vapor of a compound of the same. I have also distilled the cyanid from the reaction mixture at 1000° C. in hard glass tubes sealed at one end and placed in an iron tube. The glass tube lasted long enough for part of the cyanid to distil from the mass. With the glass I have always obtained considerable metallic sodium, which being more volatile than the cyanid, separated out in liquid form still further from the heated zone of the tube. This liberation of sodium is probably due to the contact of the vapor with the iron outer or containing tube, after the glass had partly melted. Sodium was not liberated when copper tubes were employed unless there was some unchanged sodium carbonate present in the charge.

The above cited experiments show that under diminished pressure alkali cyanids can be distilled efficiently from a mass of iron-graphite mixture at temperatures, which I have found may even be below 1000° C.; and indeed considerably lower in cases where a high vacuum is maintained. I have also been able to separate the alkali cyanids from carbonates, at least partially, by fractional distillation under diminished pressure. This may be done either in a copper or carburized iron apparatus, or the like. The process can also be applied so as to produce cyanids with both chemical and physical changes combined, as is shown in the following examples.

Cyanamids, such as that of calcium, may be treated with carbon and salt to form cyanids:

(3) $CaCN_2 + C + 2NaCl = CaCl_2 + 2NaCN$ and the cyanid may be distilled under diminished pressure from the mass. Sulfocyanids may be heated directly with carbon and iron, thus, to form sulfid of iron and cyanids:

(4) $NaSCN + Fe = NaCN + FeS$.

The alkali cyanid can then be distilled from the residues of the reaction. Also ferrocyanids and ferricyanids can be heated to form cyanids, thus:

(5) $K_4FE(CN)_6 = 4KCN + Fe + C_2 + N_2$.

Simultaneously or later the cyanid formed can be distilled under a diminished pressure. Also a mixture of sodium carbonate, iron and graphite and cyanid heated under diminished pressure to distil the cyanid, decomposes in part to yield sodium and carbon monoxid.

(6) $Na_2CO_3 + 2C = 2Na + 3CO$, thus purifying the cyanid.

These examples will serve to illustrate how effectively the method can be used chemically as well as physically to purify and to prepare cyanids.

Referring again to the apparatus given by way of exemplification, it is obvious in view of the foregoing that if the charge of graphite or other suitable carbon supplying material and the carbonate or the like, be in excess, sufficient yield of cyanid may be effected to warrant the separation of the same from the residues of the reaction and from the matter, e. g. graphite and carbonate, still unacted upon; such preparation being effected in the manner indicated. Thereafter the exhaust pump may be stopped, the valves 14 closed, and valves 13 and 15 again opened, to resume the formation of cyanid. Thus the stages of the formation and separation of the cyanid may be alternated, while both steps of the process are effectuated in the same piece of apparatus and at substantially the same temperature, if desired. I am of the opinion also that the periodic removal of the cyanid from the reaction residues is further of advantage in so far as the actual formation of the former is concerned, since if the cyanid is allowed to collect in the reactive mass, the pores or interstices between the particles of catalytic material become clogged or choked to some measure, the liquid cyanid being drawn up by capillarity along with the liquid carbonate and, at least, diluting the reactive film of the latter, if indeed the mass of liquid in a given interstice does not altogether prevent the access of nitrogen to the portions of the catalytic solution surface which constitute the walls of such interstice.

I have explained at considerable length in my companion application (Serial No. 726,924) the advantage of maintaining not only an extended catalytic solution surface, the carbon present in which, the nitrogen supplied by the stream of the same, and the alkali metal present in or liberated from the compound of the same which constitutes the source of this metal, e. g. sodium carbonate (or the alkali metal supplied as such), may react together to form the cyanid; but have also dwelt upon the desirability of maintaining a considerable portion of this surface relatively free from the liquid carbonate, or the like, so that the nitrogen and alkali metal may have an opportunity to reach said surface; the latter at most, in so far as said portion is concerned, being covered merely by a thin film of the liquid source of the alkali metal, when such source is used. The alkali metal is efficiently liberated from or adjacent to this extended film surface, while the liquid carbonate or like compound used is also vaporized, and this vapor thereafter participates in the reaction; either doing so directly, or by first decomposing to liberate alkali metal. The term "vapor" as used in certain of the appended claims is hence to be regarded as of sufficient breadth to cover both alkali metal vapor and that of a compound of such or a similarly acting metal; while the term alkali metal, or corresponding term, unless otherwise characterized, is to be regarded as of sufficient scope to cover both free metal and the element, per se, i. e. as present, at least initially, in a compound of such metal. Similar remarks apply to "carbon" and to "nitrogen", unless these words be otherwise qualified in the claims. I herein point out the further advantage of removing the bulk of the cyanid from said surface for the same reason that the bulk of the carbonate, or the like is removed, and also for the reason, which I have above indicated, that the alkali metal carbonate, or the like, will be diluted by the already formed cyanid so that the production of further cyanid is retarded. Further, at least until the iron is thoroughly carburized, owing to the reversibility of the reaction, a certain percentage of the cyanid present in the reactive mass is always being decomposed, the carbonate or the like being reformed, to subsequently again be converted to cyanid. By thus removing the cyanid from the zone of the reaction, therefore, the process as a whole is rendered more efficient and the production of cyanid per unit of time, expedited.

The application of cyanid distillation, particularly at reduced pressure, to my former process is therefore extremely beneficial from a number of standpoints, not the least important of which is the rendering possible of the economical separation of the cyanid from the reactive mass at such temperatures as to permit of the use commercially of copper or of highly carburized iron apparatus, the distillation being effected, without undue care, at temperatures below the eutectic point of the latter. It obviates lixiviation with its consequent impairment (temporary or permanent) of the efficiency of the reactive residue, and it obviates the necessity, where lixiviation is resorted to, of evaporating off or otherwise removing the water which holds the so removed cyanid in solution. It also renders possible the efficient use of such catalytic agents (in lieu of the iron) as magnesium or lithium, because with these latter lixiviation cannot well be employed owing to the action of water thereon. The separation of cyanid from the residues of the reaction, by distillation (particularly *in vacuo*) also makes practical the preparation of ammonia from sodium cyanid through the cyanate according to the equation:

(7) $NaCN + air = NaCNO + nitrogen$.

(8) $2NaCNO + 3H_2O = Na_2CO_3 + NH_3 + CO_2$.

Here, it is to be noted that the process yields far more nitrogen, equation 7, than it can use, also ammonia and carbon dioxid are obtained according to equation 8. The latter substances are exactly what is required for the ammonia soda process or for making certain amid-like fertilizers. These two reactions are each practically instantaneous and afford a means of getting ammonia from cyanids without the great disadvantage of oxidation of the iron or carbon by steam or air, the decomposition of ammonia at a red heat, the slower action of steam at lower temperatures, or the formation of cyanogen to contaminate the ammonia.

As the nitrogen may be conveniently supplied under a pressure above that of the atmosphere, in certain of the appended claims the words "under a pressure below that at which said compound was formed"—are obviously of sufficient breadth to not only cover distillation, or the like, at a pressure below that of the atmosphere, but also to cover distillation at atmospheric pressure or even above atmospheric pressure provided that the cyanogen compound was formed at a still higher pressure.

Having thus described my invention what I claim is:—

1. The process of fixing atmospheric nitrogen which comprises effecting a reaction in which an initially combined alkali metal, initially free nitrogen and dissolved carbon participate to form a cyanogen compound, by bringing the molecules of nitrogen into contact with the dissolved carbon present in an extended catalytic solution surface, while at the same time effecting a copious liberation of molecules of said alkali metal from the material with which they are combined, in the vicinity of said solution surface and distilling under reduced pressure the so formed cyanid from residues of said reaction.

2. The process of producing substantially pure alkali metal cyanogen compounds which comprises effecting a reaction in which alkali metal capable of acting as the base of the cyanogen compound sought, carbon and nitrogen participate to form said compound, and separating the latter from residues of said reaction by distilling said compound under a pressure below that at which said compound was formed.

3. The process of preparing pure cyanid which comprises effecting a separation of the cyanid present in a mass of material from the remaining constituents of said mass by subjecting said mass to a pressure below that of the atmosphere while in a receptacle the material composing which, at the points where the cyanid may encounter the same, is substantially incapable of reacting upon the cyanid to deprive it of carbon, and vaporizing said cyanid by means of heat while so under reduced pressure.

4. The process of fixing nitrogen which comprises effecting a reaction in successive stages, through the intermediacy of catalytic material disposed to present an extended surface, in which alkali metal, free nitrogen, and carbon dissolved in said surface participate to form an alkali metal cyanogen compound, and removing a portion at least of said compound from said catalytic material between said stages wherein said reaction takes place.

5. The process of fixing nitrogen which comprises effecting a reaction through the intermediacy of catalytic material, in which alkali metal, free nitrogen, and carbon in solution in said material, participate to form an alkali metal cyanogen compound, and removing a portion, at least, of said compound from said catalytic material, whereby to aid in maintaining the continued efficiency of said reaction.

6. The process of fixing nitrogen which comprises effecting a reaction in stages, through the intermediacy of catalytic material, in which alkali metal, free nitrogen, and carbon in solution in said material, participate to form an alkali metal cyanogen compound, and removing a portion, at least, of said compound from said catalytic material between two of said stages, by distillation at a temperature below the eutectic point of said carbon containing catalytic material.

7. The process of preparing pure cyanogen compounds which comprises effecting a separation of a cyanogen compound present in a mass of material from other constituents of said mass, by subjecting said mass to a pressure below that of the atmosphere while in a receptacle the material composing which, at the points where said compound may encounter the same, is substantially incapable of reacting upon said compound to deprive it of carbon, and vaporizing said compound by means of heat while so under reduced pressure.

8. The process of preparing pure cyanogen compounds which comprises effecting a separation of a cyanogen compound present in a mass of material from other constituents of said mass by vaporizing said compound, at an elevated temperature, while in a receptacle the material comprising which, at the points where said compound may encounter the same, is substantially incapable of reacting upon said compound to deprive it of carbon at said temperature.

9. The process of fixing nitrogen which comprises effecting a reaction, through the intermediacy of catalytic material, in which a metal capable of acting as the base of a cyanogen compound, free nitrogen, and carbon in solution in said catalytic material, participate to form a cyanogen compound of said metal, and removing a portion at least of said compound from said material, whereby to aid in maintaining the continued efficiency of said reaction.

10. The process of fixing atmospheric nitrogen which comprises treating an alkali metal compound to obtain a vapor therefrom by subjecting said compound to heat, reacting upon said vapor substantially simultaneously with free nitrogen and with carbon in solution in a mass of catalytic material, to form a cyanogen compound of said alkali metal, and so separating said compound from said catalytic material as to leave the latter substantially unimpaired for continued use.

In testimony whereof I have affixed my signature, in the presence of two witnesses.

JOHN E. BUCHER.

Witnesses:
 NORMAN E. HOLT,
 HOWARD C. RIPLEY.